July 26, 1955  E. T. LAKE  2,713,860
SLATE SPLITTING MACHINE
Filed Oct. 6, 1953  9 Sheets-Sheet 1
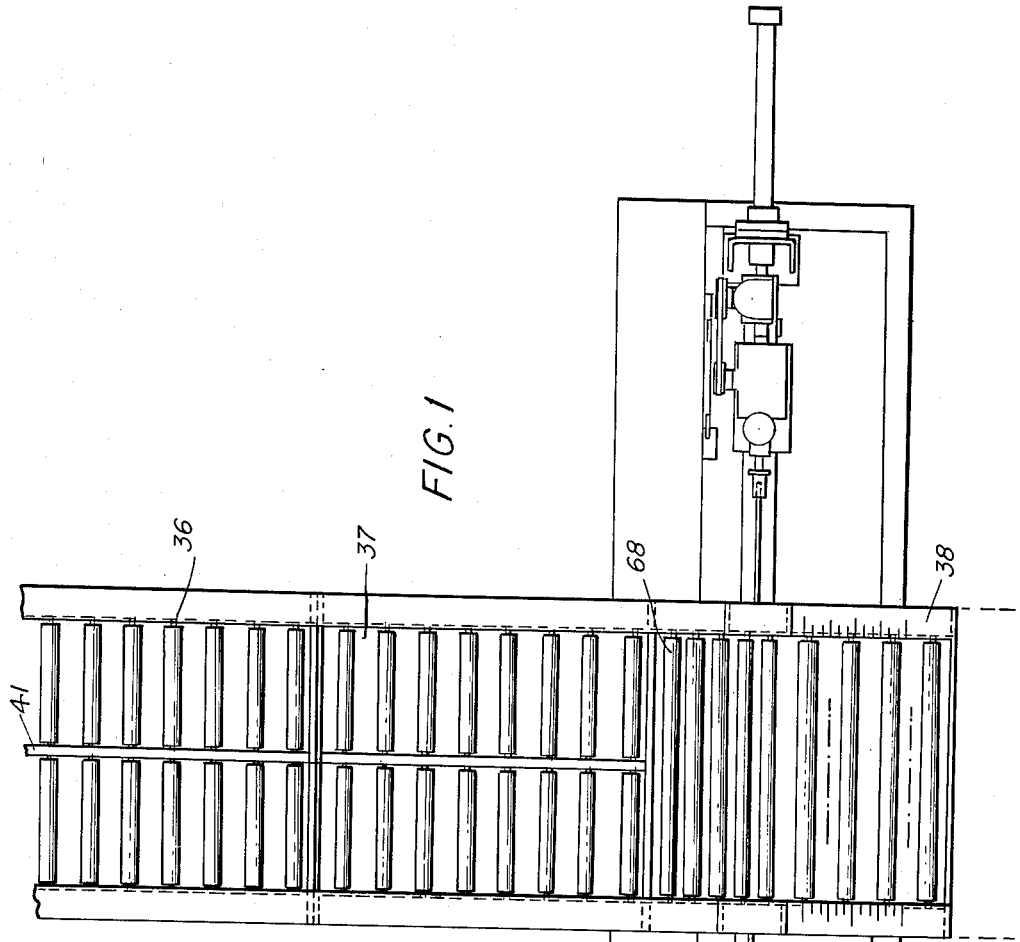
FIG. 1
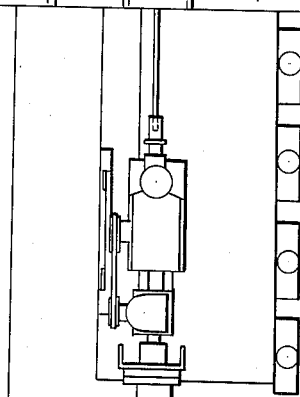
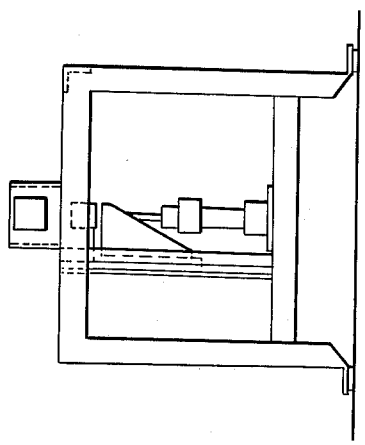
FIG. 4
Inventor
Eugene T. Lake
By his attorneys
Howson and Howson July 26, 1955
E. T. LAKE
2,713,860
SLATE SPLITTING MACHINE
Filed Oct. 6, 1953
9 Sheets-Sheet 2
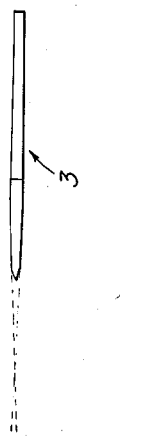
FIG.16
FIG.15
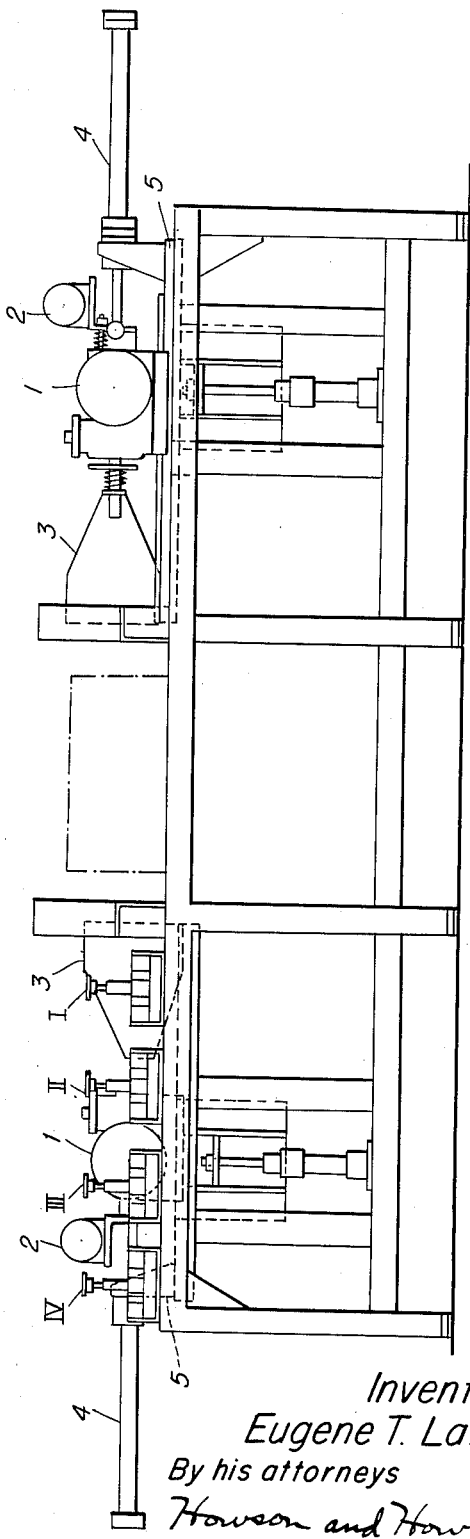
FIG.2
Inventor
Eugene T. Lake
By his attorneys
Howson and Howson

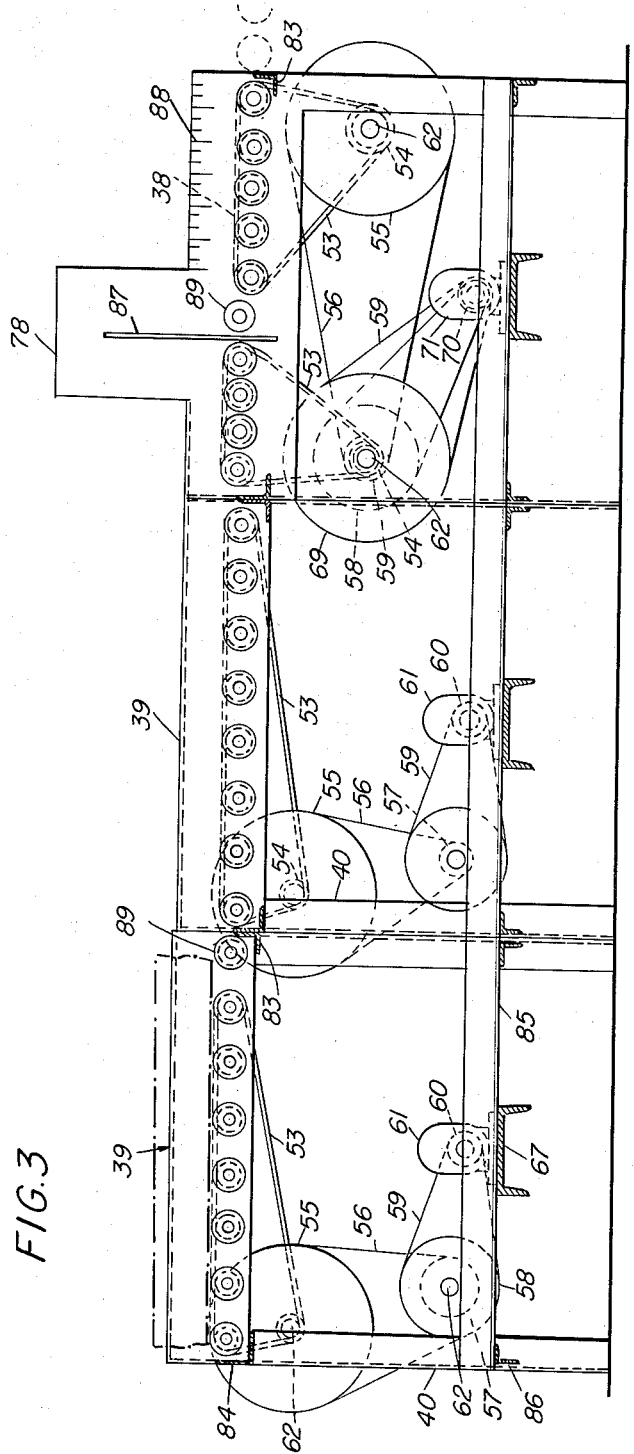

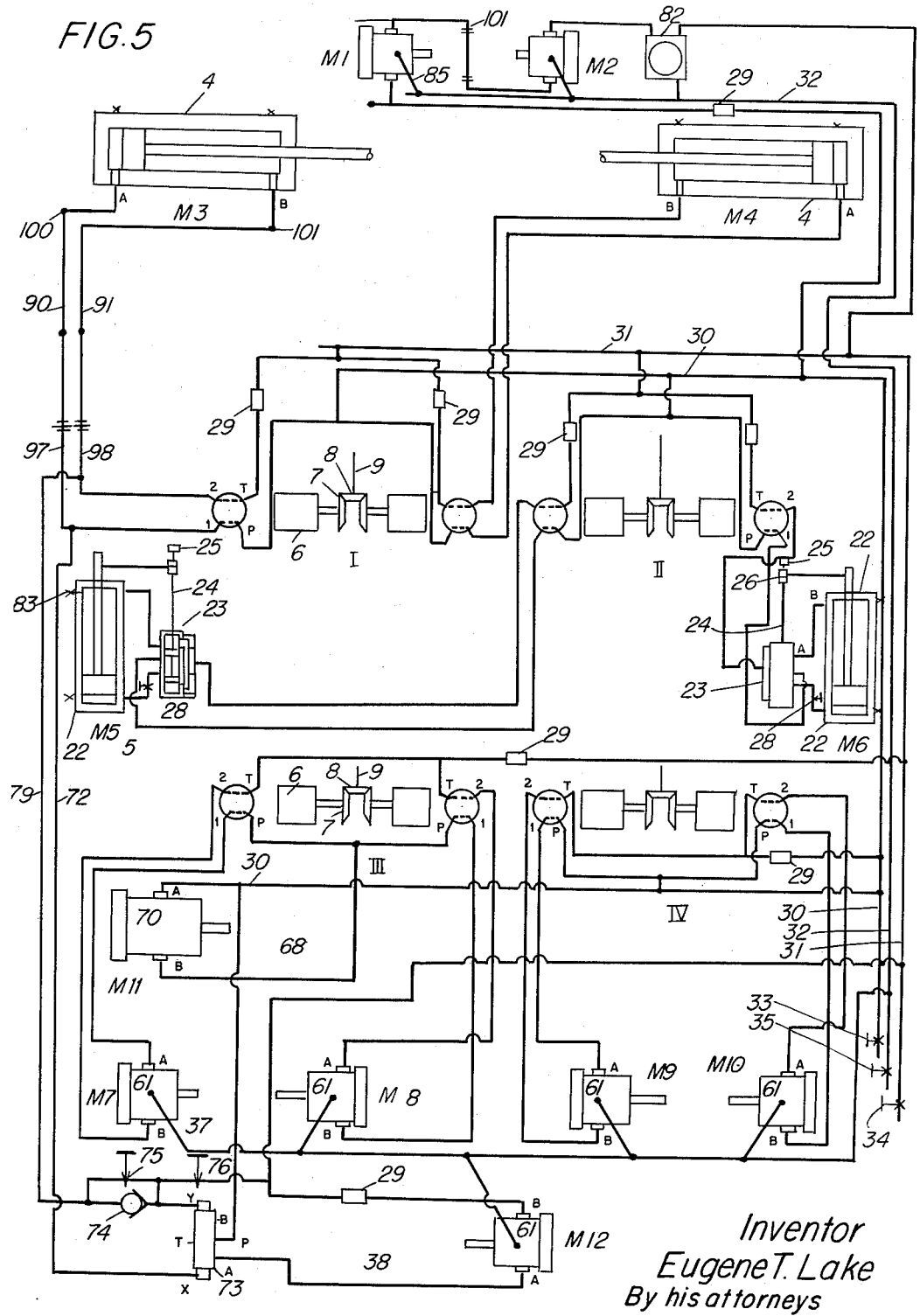

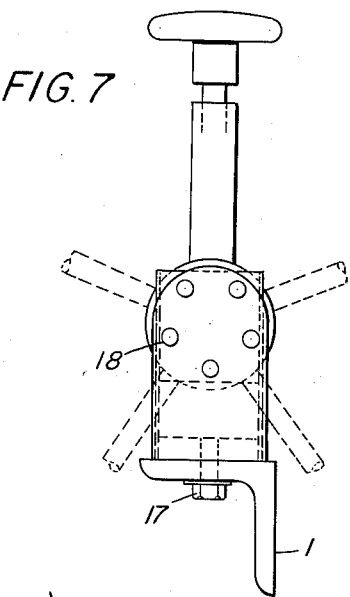
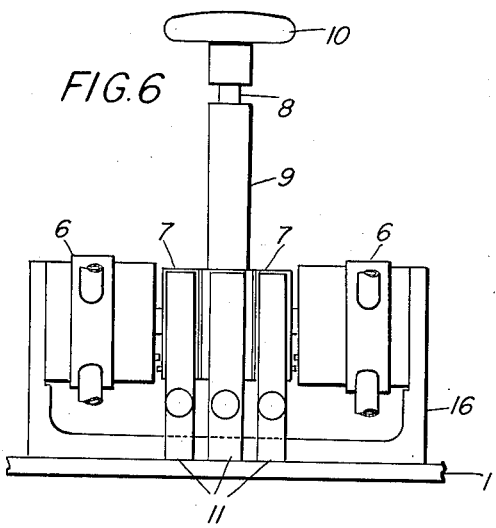
FIG. 7　　　FIG. 6
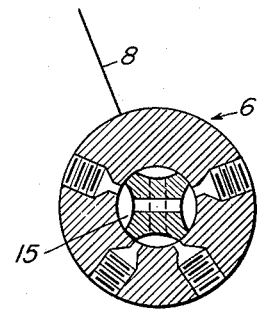
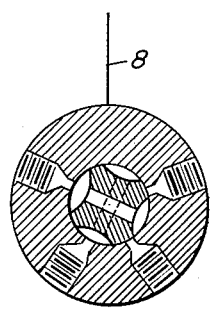
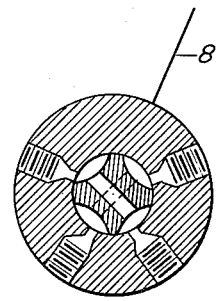
FIG. 8　　　FIG. 9　　　FIG. 10
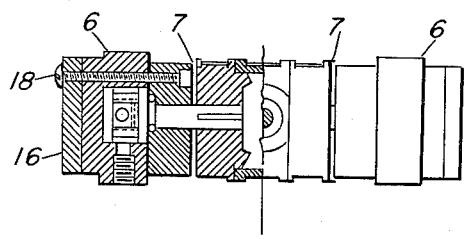
FIG. 11
Inventor
Eugene T. Lake
By his attorneys
Howson and Howson Inventor
Eugene T. Lake
By his attorneys
Howson and Howson July 26, 1955  E. T. LAKE  2,713,860
SLATE SPLITTING MACHINE
Filed Oct. 6, 1953  9 Sheets-Sheet 8

Inventor
Eugene T. Lake
By his attorneys
Howson and Howson

July 26, 1955  E. T. LAKE  2,713,860
SLATE SPLITTING MACHINE
Filed Oct. 6, 1953  9 Sheets-Sheet 9

Inventor
Eugene T. Lake
By his attorneys
Howson and Howson

United States Patent Office 2,713,860
Patented July 26, 1955

2,713,860

SLATE SPLITTING MACHINE

Eugene T. Lake, Stroud Township, Monroe County, Pa.

Application October 6, 1953, Serial No. 384,428

8 Claims. (Cl. 125—23)

This invention relates to a machine for splitting slate and more particularly to one adapted for splitting large slabs of slate at the sculping stage. By sculping I mean splitting in the direction of the grain, i. e. the secondary cleavage plane and at right angles to the primary cleavage. The slate strips which my machine will split have been made from quarry slabs by dividing the slabs on planes at right angles to the cleavage and the grain. A slate slab as brought from the quarry is large, weighs several tons and has two comparatively smooth faces on the primary lines of cleavage, and is quite irregular in shape because of the exigencies of quarrying it.

As explained in my process Patent No. 2,654,358 dated October 6, 1953, it has been customary first to saw or split the slab along the grain. Occasionally the slab has been broken across the grain but with very irregular results. It has heretofore been known to use machines to split slate along the natural or primary plane of cleavage as described in the patent to Vincent F. Lake, No. 1,590,385, dated June 29, 1926. However, to the best of my knowledge I am the first to devise a slate splitting machine adapted to split slate at the sculping stage, i. e. along the secondary plane of cleavage, namely, the grain. The great usefulness of such a machine is set forth in my above-mentioned Patent 2,654,358. My sculping machine by itself, as claimed herein, is characterized by the provision of two power-driven chisels adapted to operate simultaneously on two opposite sawn sides of a slate strip at points opposite each other while the strip is lying on its primary plane of cleavage. I have found that by first sawing the slab from the quarry across the grain at intervals equal approximately to one of the final dimensions of the desired shingle (e. g. the length of the shingle), it is possible with my sculper to split the strip in the direction of the grain with a straight split that can be used for a second dimension of the shingle. A sculper built with the double hydraulic rapid hammer mechanism herein described is particularly satisfactory for this wholly novel operation of sculping slate to final dimension by machine. Where I use the word "slate," it should be understood to refer to rock that has such development of slaty cleavage as will permit it to be split into thin sheets.

The process of advance determination of one final dimension by a saw and the second dimension by a two-bladed chisel machine is claimed in my Patent 2,654,358. To the best of applicant's knowledge no one ever had a chisel machine adapted for use at the sculping stage. The sculping machine by itself is claimed in the present application.

In the drawings:

Fig. 1 is a plan view of a machine according to my invention, showing the symmetrical arrangement of the chisels and their operating means, so that the two chisels may be driven towards each other to split a strip of slate placed between them, to produce a single split.

Fig. 2 is a front elevation of the same machine, that is showing the face toward the operator. This shows the chisels, hammers, reciprocating means, the elevators for vertical reciprocation and a slate strip on the conveyor ready to be moved to the splitting position.

The four main controlling valves are shown at the left of the conveyor, secured to the top of the frame. This point is called the "Control Station." The operator stands at this point from which he can control all the usual operations of splitting the strips into suitable lengths.

Fig. 3 shows a longitudinal section along the center line of the conveyors and the operative means for moving the slate strips into position for splitting.

Fig. 4 is a view in elevation of the left end of the machine of Figs. 1 to 3.

Fig. 5 is a hydraulic diagram showing the connections of the various hydraulic elements and the principles of the hydraulic operation of the machine.

Fig. 6 is a side view of the general assembly of the main control valves.

Fig. 7 is an end view of control valve in Fig. 6.

Figs. 8, 9 and 10 show the positions of the valve cores for three positions of the handle. Intermediate positions permit only partial flow.

Fig. 11 is a plan view of the control valve partially broken away.

Figure 12:
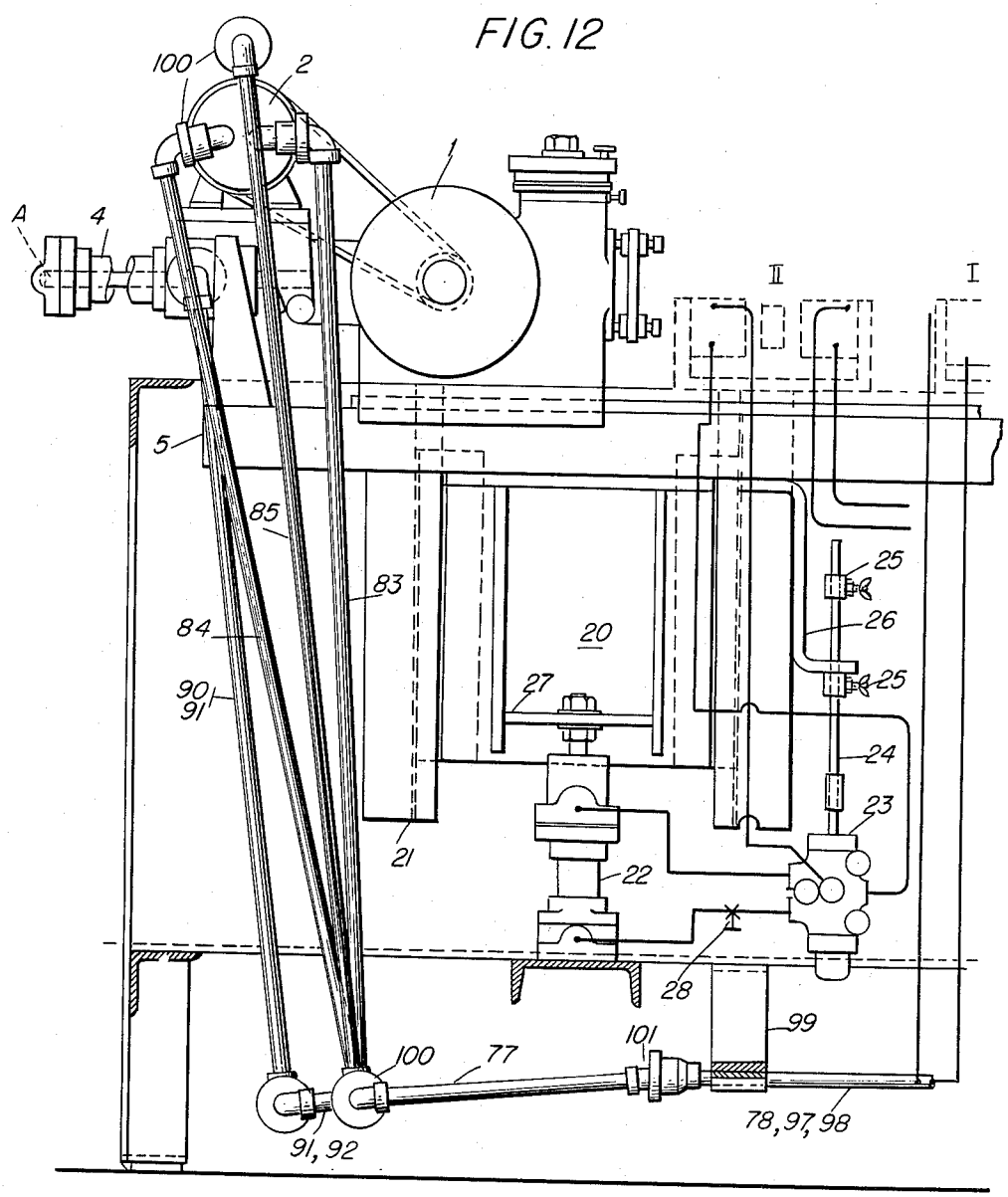

Fig. 12 is a view in elevation of the arrangement of one of the elevators and the hydraulic connections to its control valve. Also it shows the flexible connections to the hammer motor and the reciprocation cylinder.

Figures 13, 14:
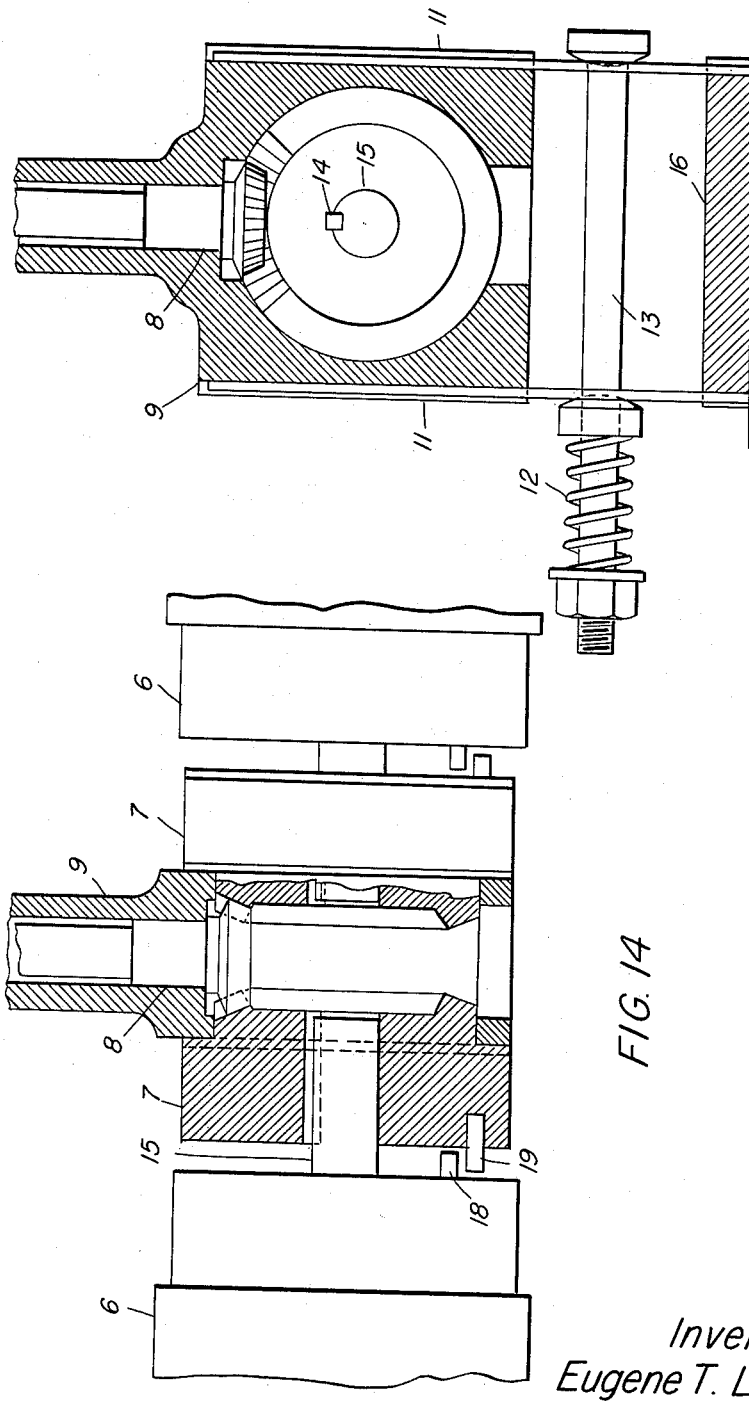

Fig. 13 is a view in section through the control valve showing how the valve is automatically returned to neutral upon release of the handle.

Fig. 14 is a view in vertical section showing how the handle hand wheel controls the two rotary pilot valves.

Fig. 15 is a side view showing a chisel blade like that shown in V. F. Lake's Patent 1,229,622, filed June 12, 1917, arranged for insertion in a shank fitting the hammer.

Fig. 16 is an edge view showing how the blade may be resharpened by simply regrinding a new edge, leaving the general taper of the blade unchanged.

Figure 17:
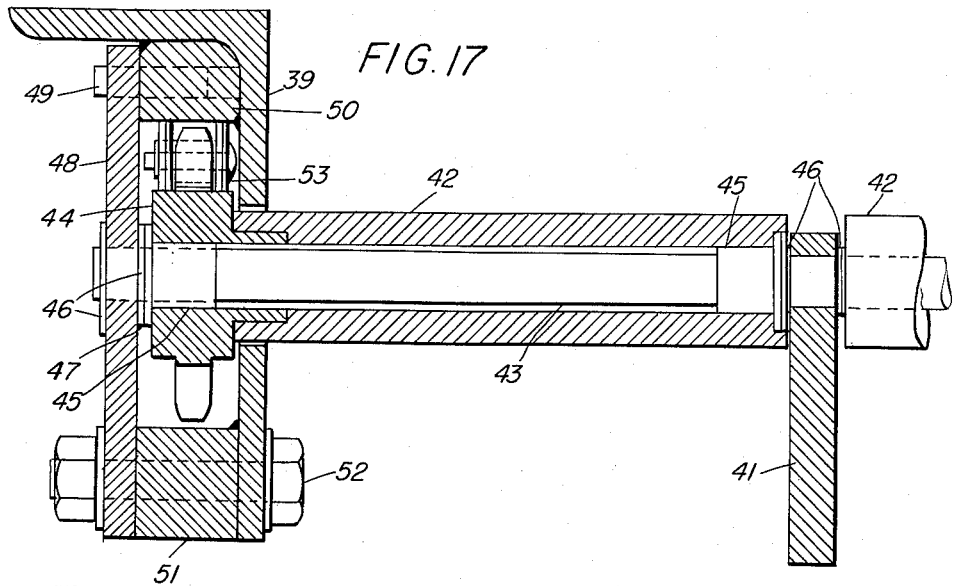

Fig. 17 is a detail view showing the construction of the conveyor rolls and their drive.

Figures 18, 19:
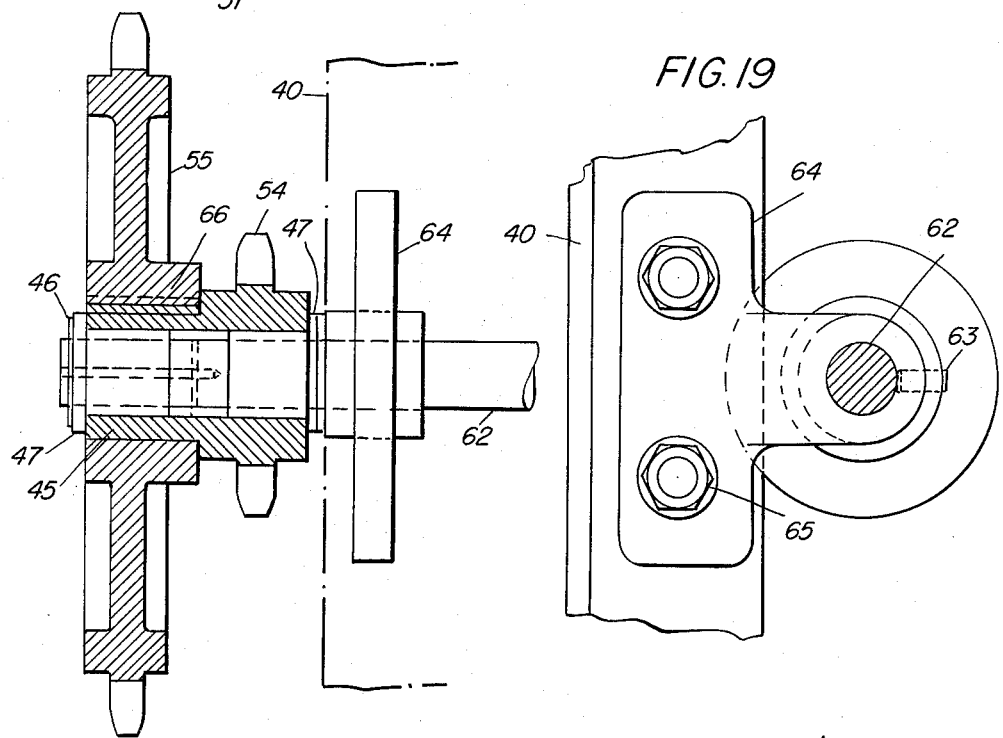

Fig. 18 is a detail view showing the support of an intermediate sprocket of the drive of the roll of Fig. 17.

Fig. 19 shows a support for holding the supporting shafts for the intermediate sprockets.

Figure 20:
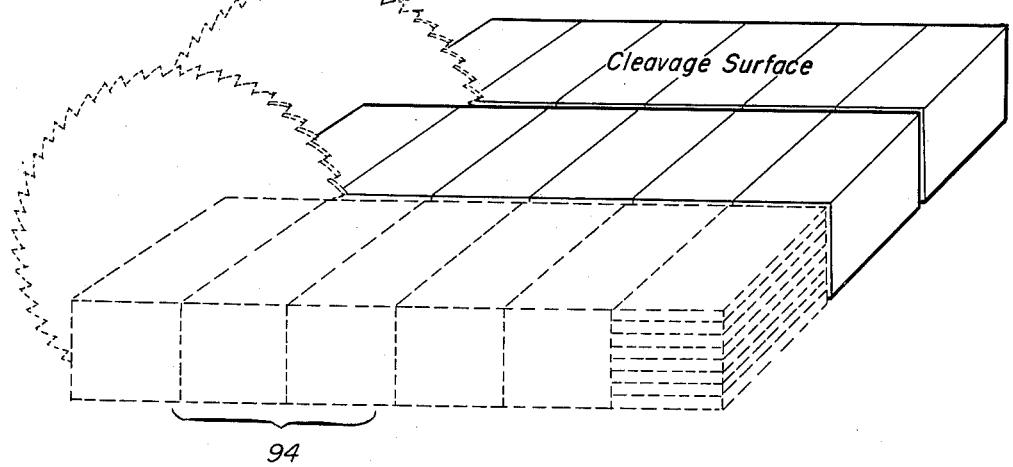

Fig. 20 is a simplified perspective view of a quarry block or slab as it is received at the mill showing the relation of the saw cuts to the characteristics of the slate, the succeeding split and the final product or shingles.

Figure 21:
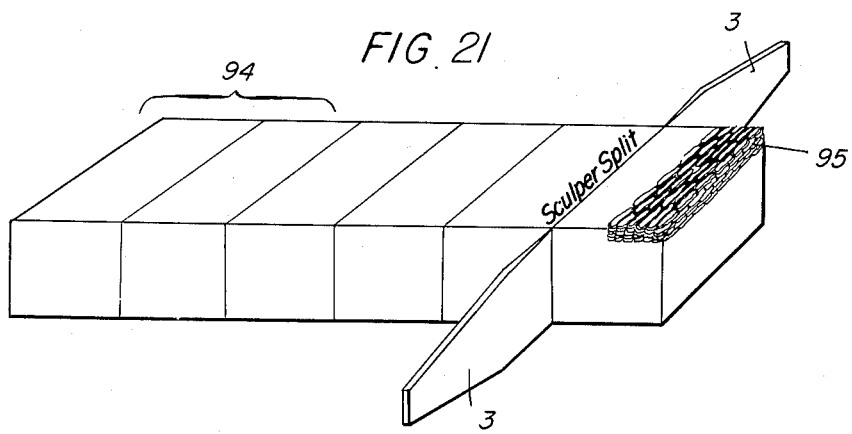

Fig. 21 is a similar perspective view of one of the strips as received from the saws showing the relation of the sculper blades to the strip and to my understanding of the grain structure of the slate.

Figure 22:
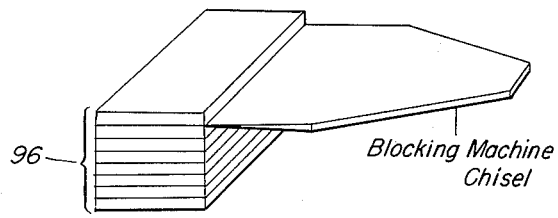

Fig. 22 is a similar perspective view of one sculped block as received from the sculper showing the relative position of the next splitting machine blade.

The exact nature of slate and its fissility has always been a subject for discussion. It is not generally understood that slate is not a laminated structure but its fissility is due to the orientation of minute crystals which produce planes or directions of weakness in which directions the stone is more easily split than in others. The direction of the easiest split is known as the cleavage plane. At right angles to this and in the direction next most easily split is the grain direction. This is the plane mostly used by this machine. Slate is composed of extremely small particles or grains 95 which apparently have been formed at a later period than the original depositing of the material so that the direction of the grains has no direct relation to the bedding for it has been produced at a different period by independent forces and produces the usual slate used in commercial production which consists of these fine grains embedded in a matrix of some mineral, like mica. The cleavage property of the material is apparently dependent primarily upon the mechanical arrangement of the grains. The grains are very small, some of them reportedly having been measured at 13 to 100 microns long by 4 to 3 microns wide. I have seen microphotographs which show the thickness of these grains to be less than the length and width. From these evidences and microphotographs and behavior of the slate when being split, I am of the opinion that the grains of slate, the fragments of the original rocks, are arranged in long, almost straight, rows in the direction called the grain and that the widths are so arranged that they point at right angles to the grain, predominantly in the same plane. The whole is encased in a matrix of grains similarly arranged but much smaller and adhering to the larger grains with more or less adhesion. I have attempted to show the arrangement of these grains very roughly at the right end of Fig. 21. It will be seen that according to this concept of the structure of slate, the grains have roughly the shape of elongated lenses, the grains being in horizontal position.

Detailed study of the action of the grains in this kind of a matrix shows a manner of action under stress which corresponds exactly with my experience in splitting slate. I also find that the particular form of rapid hammer blows from opposite sides in the direction of the "grain," i. e. in the direction of the length of the individual grains, but not in the primary plane of cleavage, which primary plane in Fig. 21 is horizontal, not only avoids the split going off in an undesired direction but enables one to handle slate which has heretofore not been considered suitable for splitting.

In order to avoid confusion and to make further identification of the showing in Figs. 20, 21 and 22, I further identify my terminology as follows.

Starting with Fig. 22, in this figure we have shown a pile of eight "eighters" or sculped block 96 which have been split apart on the primary plane of cleavage by the so-called blocker splitting machine referred to in my above-mentioned process Patent 2,654,358. The "eighters," of course, will be themselves split up into eight shingles of final shingle thickness by a center line splitting machine such as described in my Patent No. 2,626,597.

In Fig. 21, the two chisels shown are those of the sculper or sculping machine of the present application and it will be noted the chisels are in vertical position and split on the grain at right angles to the primary plane of cleavage. This split by the sculping machine of the present application is normally used to give the width of the shingles. The saw cuts which I propose would normally be used to give the length of the shingles and the center line splitting merely determines the thickness of the shingles. Thus in all three figures the thickness is the vertical dimension (in both the length and width any desired allowance can be made for dressing or trimming). It might be stated that the individual mineral flakes in thickness are equal to something in the neighborhood of one thousandth of a millimeter.

Referring again to my discovery of the usefulness of having two sets of chisels and hammers working opposite to each other capable of being moved toward each other under the control of the operator, we use two chisels with the hammering action to enable longer slabs to be split off a block with sufficient accuracy for the succeeding splitting machine because as explained in my process patent above referred to, I propose to use splitting machines in successive operations. The sculping machine works on the secondary cleavage plane which is called the grain. I explain the action of splitting off a slab of slate from a large block by means of two chisels. If I have a block of slate 24" or more in width on account of the difference in elasticity between the slate that is being split off and the remainder of the block, the result of using a single chisel would be to have the cleavage run slightly toward the short end of the block. Obviously in cutting in the direction of the grain, i. e. the secondary cleavage plane, we have a longer distance to split than in the case of the ordinary cleavage plane because we are splitting generally in the direction of the length of the ultimate shingle. The length is normally greater than the width in the finished shingle. This longer distance gives a greater chance for error and by setting a chisel and hammer in operation directly opposite the first chisel, if there is any creeping of the split due to the difference of elasticity of the walls the error will be one-half as much as if I were splitting with one chisel the full length. On some occasions, the shingle's length goes up to 33" or more so the necessity of some sort of control will be obvious.

As an example of what happens when my machine is not used, I have known the following to be done with a slab of slate about one-half inch thick. An abutment was placed at one-third of the thickness of the slate and the splitting edge of the chisel at about two-thirds of the thickness of the piece. Tapered shingles were produced. Other locations of the chisel were tried but it is indicated that the chisel could not be placed any nearer one edge than above indicated. This shows that the so-called cleavage plane is not a plane but simply a direction in which the crystals of the slate are arranged and the split will occur along the resultant line to the application of force and the weaknesses between the crystals. Thus when the chisel starts to split, the line of action not being exactly in the direction of the crystals, i. e. the longest dimension of the crystals, the force goes a little to one side. As the chisel follows up, it presses the walls apart and causes a split to jut over into the next layer of crystals and thus successively throughout the block. The surface is smooth because the whole structure is microscopic anyway. However, when using two chisels the cleavage will occur in the direction in which the chisels actually point unless the cleavage in the block diverges excessively from the line of action of the blades.

The detailed description of my novel sculping machine will be divided under several headings as follows:

A. The hammers and their drive
B. Reciprocation of the hammers
C. The various control valves
D. The elevators for the chisels
E. The conveyors
F. The supporting frame
G. Operation and hydraulic diagram

A. *The hammers and their drive*

There are two hammers 1 in the machine each driven by a motor 2. Each hammer is like the hammer shown in my Patent No. 2,626,597 above referred to. There is an hydraulic cylinder and piston to reciprocate each blade in the manner shown in that patent. Each hammer is on a carriage which also supports a splitting tool or chisel 3 in such manner that both chisels may operate at the same time on a slate block placed between them. Each hammer carriage moves on hammer slide 5 which is carried by an elevator 20 on a bracket 27 which in turn slides vertically on elevator slide 21 secured to the frame of the machine.

The manner in which the parts are put into and out of operation are different from the manner of the above-mentioned single chisel, center-line splitter Patent No. 2,626,597. The reciprocation of the hammer carriage 1 is not automatic but is fully under the control of the operator on both the out and in strokes as will be described under headings B and C. The elevators in the present machine also are adapted for the additional work of "grooving" and for this purpose is equipped with cylinders, pistons and valves for automatic vertical reciprocation. (See heading D.)

In the present machine the slate is fed to the machine, adjusted by the operator and then split—each operation being timed and controlled by the operator. In the prior machine, the operator timed his feeding of the slate to the operation of the machine.

In the center line machine the slab to be split had to be moved by hand to an approximate position and the machine automatically adjusted the slate and then split it. In the new machine, the operator through powered appliances moves the slate strip 94 to the approximate position then adjusts it and splits it and the machine automatically ejects it to a conveyor leading to the next machine.

This difference in arrangements is due to the weight of the pieces of slate handled. In the center line machine, in the manufacture of the standard shingle, the block fed to the machine is usually but eight times the weight of the finished shingle as split. In this machine, the sculper, the strip fed to the machine may weigh a ton or more and produces blocks weighing about 64 times the weight of the finished shingle. No one has ever tried to sculp slate by machine splitting.

B. *Reciprocation of the hammers*

The general construction of each chisel and hammer and the manner in which they cooperate with each other is shown and described in Patent 2,626,597. However, in the present machine there is no automatic reciprocation of the hammer carriage on the slide 5. The pressure lines and the tank lines are carried to rotary pilot valves 6 of the control valve I at the Control Station (see Figs. 2, 5, 12 and 14).

The control valve enables the operator to control both chisels simultaneously with the one hand. He may cause the chisels to approach the slate on each side at the same rate of speed, he may delay one or the other or even stop one or the other without stopping both. He may reverse one without affecting the progress of the other. He may withdraw either or both at any desired speed or move the chisels against the slate with any degree of pressure up to the limit deliverable by the machine.

By this valve he may bring the edges of the chisels into contact with slate on both sides, bring the hammers into action for grooving the slate sides and when ready to press the chisel with the pressure necessary to cause splitting.

This pressure, as explained in the center line application, varies with the variety of the slate and the rapidity of the impulses imparted by the hammer. In the experiments so far conducted, it has been found that the higher the rate of such vibration, the lower is pressure required.

C. *The control valves*

As shown in the drawings, these valves are used for four purposes in this machine.

1. For the reciprocation of the chisels.
2. For the raising and lowering of the hammers and chisels, for the grooving process and for changing blades.
3. For the adjustment of the slate strip for splitting.
4. To bring a new strip into the machine from the storage position.

To do this the valve must—

1. Direct the motion and speed of the motors or pistons that it controls.
2. It must vary the relative speeds of the two motors or pistons even to the extent of driving either in reverse to other.

In the embodiment shown, the whole control valve consists essentially of two rotary pilot valves 6 whose cores 15, Figs. 8, 9, 10 are linked together by three gears, Fig. 14, parts 7, 8, 7. With this arrangement any rotation of the pinion 8 will cause rotation of bevel gears, 7 and 7, in opposite directions. These gears being keyed to the cores 15 by keys 14 cause the cores to move in opposite directions when the hand wheel 10 (Fig. 6) on an extension of the pinion 8 is turned. If the hand wheel is held from moving by the hand of the operator but pulled toward himself, the pinion 8 cannot turn. In this event the shaft casing 9, the hand wheel 10, the pinion 8 and the gears 7 with the attached cores must move as a unit opening and closing ports in the casings 6 of the rotary pilot valves, in whole or in part, depending upon the movement of the casing 9. The turning of the hand wheel will modify the movements of the cores 15, moving one beyond the point called for by the movement of the casing 9 and holding back the other core. The motion of the cores is limited by stop pins 18 and 19. The two pins 18 are mounted on the face of the rotary valve housing 6 and the pin 19 is on the hub of the gear 7 on the same radius as the pins 18. These three pins are so placed that when pin 19 contacts either of the pins 18 the ports in the casing 6 are fully opened by the cores in the relation desired. If this contact is brought about by the movement of the casing 9 without turning of the hand wheel, both motors will be receiving full supply of fluid and the lever can be moved no farther in that direction. The hand wheel however can be turned. If it is turned anti-clockwise, the core on the right will be moved toward the closed or neutral position. If turned the other way then it goes to fully reversed position. Thus any relation of speed and direction can be imparted to the two motors, within the limits of the design.

The application of this property is described under headings B, D, and E.

The teeth on the bevel gears 7 are cut only as far as required to produce the angular movement required which is in general about 22½ degrees from the neutral position.

The outside of the gears is turned to cylindrical form to act as the bearing for the hub of the casing 9. In the lower part of the hub an opening is bored to permit the assembly of the pinion and its extension 8 in the casing 9, after which the hand wheel 10 may be fitted.

The hubs of the lever 9 and the gears 7 are flat and grooved on their sides, which are vertical when the cores are in their neutral positions, to receive the flat bars 11, Figs. 6 and 13. The lower ends of these bars rest in notches cut in the base of the frame 16. These bars are pressed against the flat sides of the hubs by the springs 12 through the bolt 13 with its adjusting nut, rocker washer and rocker head as shown in Fig. 13.

Whenever the lever 9 or the gears 7 are rotated from the neutral position, the bars 11 will be separated against the tension of the springs 12. On the release of the hand, these parts will be forced back to normal or the neutral position.

In the embodiment shown, commercial rotary pilot valves have been used. If instead of attaching the gears 7 to the cores of the rotary valves they are attached to some device changing the rotary motion to a reciprocating motion, this could be attached to such four-way straight line acting valves and produce the same effect with any capacity valves without departing from the principles here shown. Such devices are cranks, eccentric, cams, gear and rack, etc. the use of which is well known to any competent engineer.

D. *The elevators for the chisels*

Slate varies so much in its properties that some procedures are successful with some slates but are failures with other kinds. This is particularly true with the hand splitting of slate, but is not so marked with machine splitting. It has been the experience of the writer that any slate capable of being split by hand can be commercially split by machines of the Lake type to about half the thickness that it can be split commercially by hand. Some slates that the hand splitter cannot split can be commercially split by such machines.

One property of some slates that sometimes causes trouble is that in the larger masses it is difficult to split them truly unless they are grooved before being split. Such grooving may be done on this machine through the use of the elevators and a chisel with irregular edge as shown in Fig. 15 in which alternate fingers are made shorter than the other fingers.

When the operator has brought such chisels into contact with the surfaces of the slate, he may by his left hand pull the control II toward himself. This sends fluid pressure through the four way valves 23 to the cylinders 22. The piston of this cylinder is connected by the bracket 27 to the elevator 20. This causes the elevator to move up or down and when it comes to the end of its desired motion the bracket 26 secured to the slide 5 which pushes against one of the adjustable collars 25 on the rod 24 and thus pulls or pushes the spool of the valve and reverses it. This in turn reverses the motion of the elevator and the chisel will rise and lower as long as fluid flows through the valves 23. This will continue until the control valve II is closed which it will do when released by the operator.

A rough degree of regulation of the speed of this reciprocation is attained by the regulating valve 28 which is connected to the reciprocating valve 23. This is supplemented by the position of the control valve II moved by the operator. If the blade corners catch against a hard place in the rock, the motion can be reversed by pushing valve II to the back.

The starting of the groove cutting will occur when the operator pushes the chisels against the slate hard enough to start the hammer action by pushing the blade socket into the line of action as explained in the center line Patent No. 2,626,597.

Since half or thereabouts of the chisel edge is removed and the pressure in the cylinder 5 is limited by the supply pressure in the mains, the pressure on the effective edge of the blade is doubled without increasing the load on the piston. As the blade moves up and down the incipient cracks run into each other as each finger moves up and down, being given thousands of impulses per minute.

It has been found by experiment that up to 31,000 blows per minute the pressure required to start a split decreases with the increase in the rate of blows. The pressure to continue a split, once started, is very much less than what is required to start it. As the split starts, the chisel edge advances into the cracks and wedges them wider permitting further advance. By the time that the second row of edges on the chisel have reached the surface of the slate, the whole surface of the blade will be engaged in the wedging and the vertical reciprocation may be stopped.

If it should happen that the slate needs grooving along the top and bottom surface (the cleavage surfaces), the quarry slab may be put into the machine with those surfaces vertical and grooved in the same way, then turned over, adjusted and split.

E. *The conveyors and their drives*

It is proposed to provide the material for the sculper in long strips having a width a little over the length of the desired shingle, to allow for the final finishing to exact size. These strips are to be formed as long as is possible as determined by the quarry equipment available and the nature of the rock. These strips are taken across the grain and their sides are at right angles to the primary cleavage, so that the splitting in the sculper is along the grain.

An economical size seems to be about 12 feet long, a little wider than the desired shingles are long and a thickness which is a multiple of eight times the thickness of a finished shingle.

Such a strip may weight up to a ton or more and it is desirable to move it rapidly and accurately into the machine for sculping. The simplest means to accomplish this seems to be by a hydraulically-operated conveyor.

Study has shown that such a conveyor should have three main parts, as follows:

1. A conveyor that moves the strip from the storage place to the conveyor that adjusts it for splitting.
2. The adjusting conveyor, by which the strip can be adjusted rapidly and accurately for the action of the chisels.
3. A conveyor to deliver the split-off portion of the slate from the machine to a conveyor leading to the next machine.

The first and second of these parts must be under the easy and accurate control of the operator. The third should be automatic, and be put into operation early enough so that it will be up to speed by the time that the split-off is free from the strip. It should run long enough to insure that the part is delivered clear of the machine.

It is possible to make a machine to do these same things by purly mechanical means, or electrical, or pneumatic or by steam, and yet use the same principles as are here revealed. Because liquids are so nearly incompressible and at the pressures required for this work are practically so, that hydraulic devices are usually self-braking and self-locking and the devices used with the above-mentioned powers require the addition of some braking device. When so equipped they are the equivalents of the simpler hydraulic devices.

The conveyor supplying the material is under the control of the control valve IV at the control station. It is the same as the control valuve described under heading C, and is located as shown in Fig. 1.

This conveyor is shown in part at 36 and may be as long as desired and may hold several strips which may be fed one by one to the adjusting conveyor 37.

The delivery conveyor is shown at 38. A portion 68 of the adjusting conveyor is made single banked so as to feed short pieces of strip into the splitting position more accurately and also to provide a pulling force to help in swinging the strip into position for splitting.

All of these conveyors are of much the same construction so that one description will quite thoroughly cover all. The differences will be pointed as they occur.

In general the conveyors consist of angle iron frame 39 on each side, with angle iron legs 40 and braces, with one or two series of rollers 42 driven by a sprocket chain 53 arranged in the side frame as shown in Fig. 17. In the supply and adjusting conveyors 36 and 37 the rollers extend only half way across the conveyor and the common axle 43 is supported at the middle in the rib 41. The axle is restrained against movement by the retaining rings 46 in shallow grooves Fig. 17.

The rollers consist of thick pieces of tubing with a sprocket 44 fitted into one end and bearings 45 of porous metal fitted in each end. Steel washers 47 separate the flanged bearings 45 from the retaining rings 46. The outward ends of each axle are supported in a plate 48 which is aligned by the dowel pins 49 into the chain guide 50 which in turn is welded to the frame 39. The plate 48 is secured to the bottom or closing bar 51 by the bolt nut and washers 52. The closing bar 51 is secured to the frame 39 by welding, so as to form a box to contain the sprockets 44 and the chain 53. The chains go down through the closing bar 51 through openings cut for the purpose. (See Fig. 3.)

Each section of the conveyor is supported on angle iron legs 40, the legs are tied together by the longitudinal braces 85 and the lower cross braces 86. The sides 39 are tied together at ends by cross braces 84 which are also used to bolt the sections together.

Underneath the longitudinal baces 85 and extending beyond on each side sufficiently to form foundations for the motors 61 and 71 driving the conveyors are steel channels 67. Eahc section of the conveyor frame can be a unit electric-welded together.

There are five conveyor motors 61 and one motor 71. These are connected to the rollers by a system of chains and sprockets reducing the speed to that suitable for each section of the conveyors. All the motors are supported on the overhanging portions of the channels 67; motor 71 is on the right hand side of section 38 and is used to drive section 68 of the conveyor.

On each motor shaft is a small sprocket 60, 70 around which is a chain 59 to a large sprocket 58. Each of these large sprockets carries a smaller sprocket joined as shown in Fig. 18. Fig. 18 particularly depicts the sprocket arrangement for the drive of the roller sprockets and will be described shortly.

Sprocket 69 for the motor 70 carries one of the small sprockets 54 for driving the rollers and in the case of sprocket 54, that is with sprocket 69, it drives the roller sprockets of section 68 through one of the chains 53. The other small sprockets are intermediate (marked 57) and vary in size according to the speed requirements of the rollers in that section. By chains 56 they carry the motion to the large sprockets 55 in the other sections. This letter sprocket 55 is shown in Fig. 18 as on the hub of small sprocket 54. These sprockets which run as a unit are provided with flanged bearings 45 of porous metal run on the axle 62, which extends across the conveyor and overhangs on each side sufficiently to support the sprockets and is supported by the supporting brackets 64, bolted to the framing by the bolts 65. The shaft is secured in the supports by set screws 63.

The hydraulic control of the motors will be described under heading G.

The sides of the conveyor section 38 differ from those of the other sections in that they are carried higher and made of plate and angles so as to surround the blade openings 87 through which the blades or chisels 3 advance to do the splitting. On the sides and tops of the framing beyond the splitting position, scales 88 are marked to show the operator the distance that the edge of the slate has advanced beyond the splitting line of the chisels.

The last roll 89 of section 36 is free, having no sprocket to drive it and hence will turn only as driven by its contact with the slate strip. The roll surface of section 36 is a fraction of an inch above the roll surface of section 37. The result of this arrangement is that when the slate strip has been moved so that its center of gravity has passed this free roll the front end of the strip drops until it contacts the rolls of section 37. At the same time the rear end will lift off of the rolls of section 36 and their motion will no longer cause motion of the strip. When the operator starts section 37 the strip will be pulled off of the free roll.

Section 37 and section 68 together form the adjusting arrangement for bringing the strip into exact position for splitting. Section 37 should be a little longer than the longest strip to be used. Owing to the fact that there are a set of rolls on each side of the conveyor whose motions and speeds are under the control of the operator, he can cause one side to run at a different speed or direction from the other. This produces a turning force on the strip causing it to change its axis direction and movement on the conveyor.

By judicious movements, the operator controls the position of the strip as to the center of the conveyor and parallelism of the strip to the axis of the conveyor, also the distance that the front end passes the line of chisel action. As this line is at right angles to the center line of the conveyor, the split will normally be at right angles to the center line of the strip.

In section 68 the rolls run clear across the conveyor and are so connected hydraulically that their motion is normally forward only, regardless of the direction of motion of the rolls in section 36. The speed of the rolls in conveyor section 68 is a little higher than the speed of the rolls of 37 when the motion is forward. The speed of section 68 is automatically controlled by the speeds of the rolls of 37. The explanation of this is given under heading G.

The object of the adjusting conveyor section 37 and section 68 is to provide for the parallel feeding of short portions of the strip and also help to turn the strip by providing a straight pull into the splitting position.

The first roll in section 38, the delivery section, is free and placed on a level with the rolls of part 68. The other rolls of 38 are placed a fraction of an inch below those of 68. The result is that when the strip is fed to splitting position, the front end overhangs the rolls of 38 without touching them, however when the split occurs, this end will fall on to the rolls of 38 and be quickly carried away. The speed of 38 should be considerably higher than that of 68.

There is no need that 38 should run all the time, but it should be running at nearly full speed when the split-off falls upon it and continue until the split-off has been removed from the machine and then stop. How this is accomplished hydraulically is explained under heading G.

F. *The supporting frame*

The framing is made up in sections bolted together as follows:
1. Framing of the supply conveyor 36.
2. Framing of the adjusting conveyor 37.
3. Framing of the feed conveyor 68.
4. Framing of the delivery conveyor 38.
5. Framing supporting left hand hammer and its appliances.
6. Framing supporting the right hand hammer and its appliances.

These sections are made up chiefly of angle iron and structural shapes and some plates all electric-welded together so each section is a complete unit. These are to be bolted together as required. The approximate forms of these sections have been indicated in the foregoing descriptions as well as most of the parts.

G. *Operation and hydraulic diagram*

Much of this has been described in the foregoing and hence only those things not so covered will be treated here.

The purpose of this machine is to carry out the second step described in my said process Patent No. 2,654,358.

The first step of that process results in strips of slate having a width a little greater than the length of the desired shingle. This machine splits them into lengths a little greater than desired width of the shingles thus forming blocks for the succeeding machine of the process, having top and bottom surfaces on the cleavage plane and of a thickness equal to the original slab.

With the apparatus herein disclosed, the operator brings the strip from a storage position to the adjusting position, adjusts it and splits it, controlling these operations from the control position at the left of the delivery and at the front of the machine. The machine automatically delivers the split-off block to the conveyor leading to the next machine, while operator feeds the strip into position for a new split.

As the features of the hydraulic system have been described in many respects in the foregoing, only those which have not been previously covered will be described here.

It is the purpose of the inventor in arranging a mill for the manufacture of the full range of sizes of roofing slates to provide a relatively large number of center line splitting machines, a few dressing machines, about one blocker to eight splitters, one sculper to each group of four or less blockers, and one duplex saw for each capacity of 400 squares per day.

Each of these machines will be powered by or controlled by hydraulic power. To provide this, there will be at some convenient point a hydraulic power unit from which runs a pressure line to service all machines and to which, from all machines will run, a tank or return line, and, from those requiring it, a drain line.

At suitable points on these lines valved branches will be provided ending in threaded couplings. Each machine will be provided with corresponding machine mains with valves, and couplings so that any machine may be readily disconnected and reconnected, if desired in another place, without the loss of much fluid.

In Fig. 5 the machine pressure main line is numbered 30, the tank line 31 and the drain line 32. The corresponding valves are 33, 34 and 35. The couplings are not indicated on the plan but will be placed as close as possible to the valves.

From these machine mains, branches will run out to the devices or valves requiring their service. Most of these have been described but the following circuits might have further description.

The mechanical parts of the hammer drive is the same as for the center line machine but the hydraulic part is different. When the valve 33 is opened, fluid flows along the machine main 30 until it reaches the branch to the hammer circuit, then to the flow control valve 82, then to and through the first motor M2, thence to and through the second motor M1 to the pressure tank line and through the back pressure and check valve 29 to the machine tank line 31. To change the speed of the motors, it is only necessary to change the amount of fluid flowing through the system by turning the dial on the valve 82. As the fluid all goes through both motors, the motors run at the same speed and as all the fluid passes out through the same back pressure valve the system cannot be drained except by intention.

As the motors M1 and M2 are mounted on the hammer and chisel carriage 1 on each side of the machine, there must be two sets of flexible connections for the motors for the fluid supply and return and the drain line. This is shown in Fig. 12 for the left hand side of the machine. A similar arrangement is used on the right hand. The horizontal motion is in the neighborhood of 12 inches for shingle making machines and the vertical motion for grooving may be 3 inches, for illustration, so it is necessary that the fluid services be carried out while the motor is moving over an area of about 3 inches by 12 inches and this is provided in the following manner.

On each motor three swivel elbows 100 are provided as shown in Fig. 12, one for each service. Into these are screwed three pipes connecting them to three similar elbows 100 near the floor. These in turn are connected by three pipes 77 to three swivel joints 101 on pipes 78 which are parts of stationary parts of the circuit.

The hammer circuit has in part been described under headings B and C but the flexible connections permitting the rise and fall of the cylinders has been omitted but is shown in Fig. 12.

On the far side of the cylinder 4, an elbow is secured in the port A and from this a pipe 89 is led along the far side of the cylinder until abreast the port B. There an elbow of the swivel type 100 and from this a pipe 90 runs down to another swivel elbow 100 near the floor; this is connected by a pipe 91 to another swivel joint 101 which is on the end of a pipe 97. This pipe 97 is a part of the hammer reciprocation system. On the near side of the cylinder 4 at the port B, a similar swivel elbow 100 is connected to the port and to a similar swivel near the floor and this by another pipe 92 to a swivel joint 101 on a pipe 78 which is part of the hammer reciprocation system.

These swivel joints and swivel elbows are commercial allowing sufficient angular motion in any plane for this machine's requirements.

The pipes 78 are fixed pipes and are held rigidly in position by the bracket 99 secured to the framing. The hammer motor and cylinder on the other side of the machine is similarly equipped.

Thus for the reciprocation of the cylinders the flow is from the main 30 to the control valve I where it divides to the pilot valves and the return is from the rotary pilot valves 6, 6 to the back pressure check valves 29, 29 then uniting to the main 31. The pilot valves 6, 6 as directed by the casing 9 and pinion 8, connect the ports 1 and 2 to the ports P and T, of either or both valves. (See heading B.)

In a similar manner the control valve II is connected to the mains 30 and 31. The ports 1 are connected to the ports P of the reciprocation valves 23, 23 and the ports A of those to the ports B of the cylinders M5 and M6 (22, 22) and ports B to ports A. The effect is that the chisels rise and fall as long as the handle 9 is not vertical and the reciprocation stops as soon as the handle is released.

A branch from the pressure main leads to the port A on the motor M11(70) and passing out at B runs to the control valve III where it is divided to the pressure ports P of each of the pilot valves. The ports T of each are connected through the back pressure valve 29 to the tank line 31. The ports 1 and 2 of the pilot valves are connected respectively to the ports A and B of the motors M7 and M8 (61, 61). The effect of this arrangement is that when the casing 9 of valve III is moved off of the vertical, the passage of fluid is made possible through motors M7, M8 and M11. M7 and M8 will reverse or change speed according to the position of the casing 9 but M11 will run only in one direction and at a speed according to the amount of fluid jointly used by motors M7 and M8. M11 is connected to conveyor section 68 and M7 and M8 to section 37.

The control valve IV derives its pressure from the main 30 but is otherwise piped similar to valve III but for the control of motors M9 and M10 which are connected to the supply conveyor 36.

The delivery conveyor 38 does not need to run until the split-off falls upon it and then it should be running at full speed or close to it. This can be provided by controlling this motor by a four-way valve 73 remotely controlled by the pressure and tank lines to one of the hammer cylinder's lines.

Thus port A of the motor M12 may be connected to the port A of the hydraulically controlled valve 73 and the ports T and B of that valve permanently blocked. Ports $x$ and $y$ lead to pistons moving the valve spindle so that when pressure is at $x$ the port A is open and pressure will flow to M12. If port $x$ is connected to the line out of either of ports 1 of valve I, whenever the chisel on that side of the machine is started pressure will be produced at $x$ and motor M12 will start. The port $y$ if connected to the line from port 2 will send pressure to $y$ whenever the chisels are withdrawn.

It is not desirable to stop M12 because of a momentary stoppage of the chisel advance or a momentary withdrawal of the chisel. Hence it is not permissible for a sudden build-up of pressure at $y$ sufficient to move the spindle of valve 73. This is arranged by a check valve 74 in line 79 permitting flow from $y$ but not toward $y$ and a by-pass with the needle control valves 75 and 76 connected to $y$ and the tank line. By this arrangement, whenever the piston commences to move the chisel toward the slate, the motor M12 will start up and by the time the split-off drops, the discharge conveyor will be running at full speed or nearly so. When the valve I is reversed to cause the chisels to return, pressure is thrown on line 98 and 97 is connected to the tank line and the pressure is reduced in 97. Hence pressure is reduced at $x$ but builds up at check valve 74, causing it to close. Pressure builds up then at 75 and fluid slowly passes into the space between the valves 75 to 76 and $y$. Valve 76 discharges into a line leading to the tank main 31. The valve 76 must pass less fluid than valve 75. Then the build-up of pressure against $y$ will be slow and can never rise above what it is in line 98. Hence it will be some time after the reversal of the chisel that the pressure will build sufficiently to close the port A of the valve 73 and this period is determined by the setting of the valves 75 and 76 and when once determined the valves may be locked.

I claim:

1. A slate splitting machine comprising two chisels facing toward each other, the blades lying in the same plane, hammer means associated with each chisel adapted to give the latter rapid repeated blows toward the opposite chisel, said chisels being adapted to operate at points at the edges of a strip of slate which are opposite to each other, in combination with operator-controlled, hydraulically-driven power means adapted to cause the chisels to sculp the strip from opposite sides simultaneously; whereby the direction of splitting is controlled and the slate strip is split accurately in the direction of the grain.

2. A slate splitting machine comprising a supporting frame, a pair of slate splitting chisels moving to and fro in the same plane with their splitting edges toward each other, each chisel being associated with hammer means for imparting a rapid series of forward impulses to the chisel, and movable carriages each supporting a chisel and its hammer means, in combination with a piston connected to each carriage and a cylinder in which the piston is moved to and fro by fluid pressure; and manually-operated valves controlling the flow of fluid pressure to the ends of the cylinders, whereby the piston movements and pressure of the chisels on the slate are controlled at all times by the operator.

3. A slate sculping machine comprising two chisels facing toward each other, the blades lying in the same plane, hammer means associated with each chisel adapted to give the lattter rapid repeated blows toward the opposite chisel, said chisels being adapted to operate at points at the edges of a strip of slate which are opposite each other, in combination with operator-controlled, hydraulically-driven power means adapted to cause the chisel to sculp the strip from opposite sides; said power means including a unitary manually-operated valve adapted to apply hydraulic pressure and therefore drive the chisels simultaneously; whereby direction of the splitting is controlled and the slate strip is split accurately in the direction of the grain.

4. A slate sculping machine according to claim 3 in which the hydraulically-controlled valve in a unitary, duplex, multiple-way valve adapted to be set to drive both chisels or either chisel alone as desired; whereby the pressure of the chisels and the start of their operation can be adjusted to the position of the block in the machine.

5. In a slate sculping machine according to claim 3 the provision of a unitary, duplex, multiple-way valve in which the drive for either or one of the chisels can be shut off by the operator manipulating the unitary drive; whereby if the condition of the slate causes splitting to occur unevenly the progress of the two splits can be evened up.

6. A slate sculping machine according to claim 3 in which there is a conveyor means for delivering the sculped block from the machine comprising a free roll in combination with a power-driven conveyor adjacent to but at a lower level than the free roll, and a connection from the power means of the chisels to the conveyor; whereby when either chisel begins to advance the conveyor will operate and will move the block when the split is complete and the block drops off.

7. A slate sculping machine according to claim 6 in which there is valve means in the conveyor connection adapted to stop the conveyor when the chisels retract.

8. A slate sculping machine according to claim 7 in which there are needle valves in the conveyor connection valve means whereby the conveyor runs for a short period after the chisels retract and the block is cleared from the machine.

References Cited in the file of this patent

UNITED STATES PATENTS

| | | |
|---|---|---|
| 1,590,385 | Lake | June 29, 1926 |
| 2,514,352 | Solomito | July 4, 1950 |
| 2,552,958 | Graham | May 15, 1951 |
| 2,593,606 | Price | Apr. 22, 1952 |
| 2,626,597 | Lake | Jan. 27, 1953 |
| 2,654,358 | Lake | Oct. 6, 1953 |